(12) United States Patent
Wilkinson

(10) Patent No.: US 6,331,009 B1
(45) Date of Patent: *Dec. 18, 2001

(54) CONTROL WHEEL ASSEMBLY FOR TROLLEYS

(75) Inventor: Wesley Wilkinson, South Oakleigh (AU)

(73) Assignee: Work Systems Technology Pty Ltd., Oakleigh (AU)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/945,017
(22) PCT Filed: Apr. 26, 1996
(86) PCT No.: PCT/AU96/00246
 § 371 Date: Oct. 27, 1997
 § 102(e) Date: Oct. 27, 1997
(87) PCT Pub. No.: WO96/33900
 PCT Pub. Date: Oct. 31, 1996

(30) Foreign Application Priority Data

Apr. 28, 1995 (AU) .................................................. PN2658

(51) Int. Cl.⁷ ..................................................... B62B 3/00
(52) U.S. Cl. ................................. 280/33.996; 280/79.11; 280/DIG. 4
(58) Field of Search ......................... 280/33.992, 33.996, 280/43.17, 79.11, 79.3, 124.158, 659, DIG. 4, FOR 168, 43.22, 43.23

(56) References Cited

U.S. PATENT DOCUMENTS

| | | | |
|---|---|---|---|
| 913,943 | * | 3/1909 | Brown .................................. 280/79.3 |
| 1,082,160 | * | 12/1913 | Kurowski .......................... 280/43.22 |
| 2,935,331 | | 5/1960 | Ledgerwood . |
| 3,647,239 | * | 3/1972 | Katsumori . |
| 4,257,580 | * | 3/1981 | Schnitzius . |
| 4,346,906 | * | 8/1982 | Thorpe ............................ 280/33.996 |
| 4,456,273 | | 6/1984 | McKinnon . |
| 4,580,800 | * | 4/1986 | Upton et al. ..................... 280/33.992 |
| 5,083,625 | * | 1/1992 | Bleicher ............................... 180/65.1 |
| 5,397,148 | * | 3/1995 | Nelson ................................. 280/416 |
| 5,564,680 | * | 10/1996 | Sano et al. . |
| 5,772,237 | * | 6/1998 | Finch et al. .......................... 280/704 |

FOREIGN PATENT DOCUMENTS

| | | | |
|---|---|---|---|
| 43599/85 | | 12/1985 | (AU) . |
| 80040/87A | | 4/1988 | (AU) . |
| 65494/90 | | 5/1991 | (AU) . |
| 19510992A1 | | 9/1995 | (DE) . |
| 0352647A2 | | 1/1990 | (EP) . |
| 0352647A3 | | 1/1990 | (EP) . |
| 2648775 | | 12/1990 | (FR) . |
| 2052399A | | 1/1981 | (GB) . |
| 2232386 A | * | 12/1990 | (GB) .............................. B62B/3/00 |
| 1402468 A1 | * | 6/1988 | (SU) . |
| WO85/05334 | | 12/1985 | (WO) . |
| WO93/25398 | | 12/1993 | (WO) . |
| WO94/08801 | | 4/1994 | (WO) . |

* cited by examiner

*Primary Examiner*—J. J. Swann
*Assistant Examiner*—Christopher Bottorff
(74) *Attorney, Agent, or Firm*—Crowell & Moring LLP

(57) ABSTRACT

A trolley control wheel assembly adapted to be fitted to a trolley having a longitudinal axis of travel includes (1) an array of castors; (2) a fixed wheel or wheels adapted to be positioned at or near the load center of the trolley or at or near the center of the array, and (3) bias and damping to provide controlled contact between the wheel or wheels and a surface on which the trolley is intended to travel. The bias damping may jointly comprise a gas strut.

2 Claims, 4 Drawing Sheets

CONTROL WHEEL ASSEMBLY FOR TROLLEYS

FIELD OF THE INVENTION

This invention relates to a control wheel assembly for a trolley and to a trolley fitted with such an assembly and particularly relates to control wheel assemblies for hand trolleys fitted with castors and includes, by way of example trolleys for the carriage or transport of goods in supermarkets, trolleys for the carriage or transport of baggage at airports, trolleys for the carriage or transport of goods in warehouses and offices, trolleys for the carriage or transport of patients or food or medicines or medical equipment in hospitals and perambulators or "prams". As is well known, castors are provided on trolleys to enable the trolley to be propelled in any desired direction independent of the direction in which the trolley may be apparently orientated.

1. Background of the Invention

Trolleys of the above type have a base frame which is usually fitted with four castors to enable the trolley to be pushed in any direction and manoeuvred in sometimes confined spaces. Such trolleys are notoriously difficult to control and steer, particularly if any of the castors becomes worn, dirty or damaged or if the trolley is operated on a sloping, slippery or uneven surface.

2. Discussion of the Prior Art

A number of attempts have been made to overcome the problem of controlling such trolleys. European Patent application No. A2 0 352 647 Wanzl Metallwarenfabrik GmbH, discloses a stackable (nestable) shopping trolley having four guide castors at the corners of the frame of the trolley and having one (or more) support castors or wheels located under the centre of the frame. The support castors or wheels are spring biased to press onto the ground to prevent the trolley rolling sideways on an incline. The castors or wheels are hinged to move out of the way when the shopping trolley is nested with other similar trolleys. Australian Patent No. 589,046 (European 0 267 817) Ostosvaunuholto Oy, discloses a trolley having four castors and a fifth wheel (or pair of wheels) at about the centre of the frame of the trolley.

The trolley has a bottom frame having all wheels or castors attached to it in which: the bottom frame is substantially "M" shaped in plan view; the tour castors and the fifth wheel(s) are not coplanar such that e.g. the front or rear castors do not touch at the same time on a flat surface. The fifth wheel is thus not spring biased. The arrangement is designed to overcome the difficulty of steering trolleys which becomes greater as the load on the trolley becomes greater. Australian Patent Application No. 42540193, Lloyd discloses a five castor trolley in which the fifth "central" castor can be simply automatically locked against vertical axis rotation during use and unlocked when it is desired to move the trolley sideways. Australian Patent Application No. 51532/93 Feron Investments Limited, primarily discloses a trolley with castors in which the axes of the castors may be varied from the vertical in any one or more of the forward, rearward or sideways directions. The specification also discloses the possible use of a fifth castor which is only disclosed as being situated between the front castors.

Australian Patent No. 640,700 Lovie & Grantham, discloses a castor lockable about the vertical rotation axis similar to Lloyd above. Australian Patent No. 573,843, Kart Gard Internationale, Inc., discloses a shopping cart security device in which a fifth wheel drops and locks automatically when the trolley is pushed over a hump which makes the trolley difficult then to control. British Patent Application No. 2,052,399, Cheddar Valley Engineering Limited, discloses a nestable trolley with a "V" frame and a hinged rectangular base with two fixed wheels on the arms of the "V" at about the pivot between the base and the frame and two castors on the opposite ends of the base with a fifth castor at the point of the "V" of the frame. The two castors provide stability to the triangular configuration of the fixed "V" frame wheels and the fifth castor under load. U.S. Pat. No. 4,456,273, McKinnon, discloses a trolley frame of "M" plan configuration in which the two side arms of the frame can pivot to abut the middle arms of the "M" frame. McKinnon does not disclose a fifth wheel assembly. None of the above appear to have solved adequately the problem of controlling trolleys as there is still widespread use trolleys which merely have four castors and which, after a while become difficult to control and steer. Whilst the prior art discloses the use of a "fifth" wheel arrangement, none of the prior art discloses or suggests the use of a fifth fixed wheel assembly which includes bias means to bias the fifth wheel towards surface on which the trolley is travelling and damping means to control the effect of the bias means or a single bias and damping means combination.

BRIEF DISCLOSURE OF THE INVENTION

It has unexpectedly been found that the provision of a trolley control wheel assembly with a combination of damped bias means to a trolley allows excellent control of the trolley as compared to presently used trolleys without such an assembly. The control wheel assembly controls the direction of travel of the trolley over and above the influence of the castors. The control wheel assembly includes a fixed wheel means which includes a wheel which is able to rotate about it's hub axis but is not able to rotate about a vertical axis as can a castor.

The present invention therefore provides in one preferred form a trolley control wheel assembly adapted to be fitted to a trolley having a longitudinal axis of travel and an array of castors, which assembly includes a fixed wheel or wheels positioned at or near the load centre of the trolley or at or near the centre of the array and which includes a bias means and a damping means to provide controlled contact between the wheel or wheels and a surface on which the trolley is intended to travel. The present invention also provides in another preferred form a trolley having a longitudinal axis of travel and having an array of castors fitted thereto and a trolley control wheel assembly which includes a fixed wheel or wheels positioned at or near the load centre of the trolley or at or near the centre of the array and which includes a bias means and a damping means to provide controlled contact between the wheel or wheels and a surface on which the trolley is intended to travel. The present invention also further provides, in a trolley having a longitudinal axis of travel and having an array of castors on which the trolley can be moved from place to place in the general direction of the longitudinal axis of the trolley or otherwise, the improvements which comprises the provision of a control wheel assembly, which assembly includes a fixed wheel or wheels positioned at or near the load centre of the trolley or at or near the centre of the array and which includes a bias means and a damping means to provide controlled contact between the wheel or wheels and a surface on which the trolley is intended to travel. Preferably the load centre of the trolley and the centre of the array of castors coincide. The force exerted on the control wheel by the damped bias means is not so excessive as to lift any of the trolley castors off the travel surface when the trolley is unloaded. In other words, the force of the bias means must not exceed the weight of the empty trolley. Preferably, the force of the bias means is independent of the load on the trolley. Preferably the bias means and the damping means are jointly provided by a gas strut. Preferably the trolley has four castors preferably disposed at or near the corners of the trolley or disposed effectively at or near the corners of the trolley. Preferably the array of castors includes four castors. Preferably, in order to facilitate lateral manoeuvring of a trolley there is preferably provided a lifting means to lift the wheel of the control wheel assembly out of contact with the floor or other travel surface to enable the trolley to be more readily moved at right angles to the customary desired direction of movement or travel. 19. Alternatively the invention provides a castored trolley, control wheel assembly, which includes a fixed wheel or wheels or wheel equivalent which includes a bias means and a damping means to provide controlled contact between the wheel or wheels and a surface on which the trolley is intended to travel. Preferably the bias and the damping are both provided by a gas strut.

BRIEF DESCRIPTION OF THE DRAWINGS

Referring to the drawings there is shown preferred embodiments of the invention as follows.

DETAILED DESCRIPTION OF THE INVENTION

Figure 1:
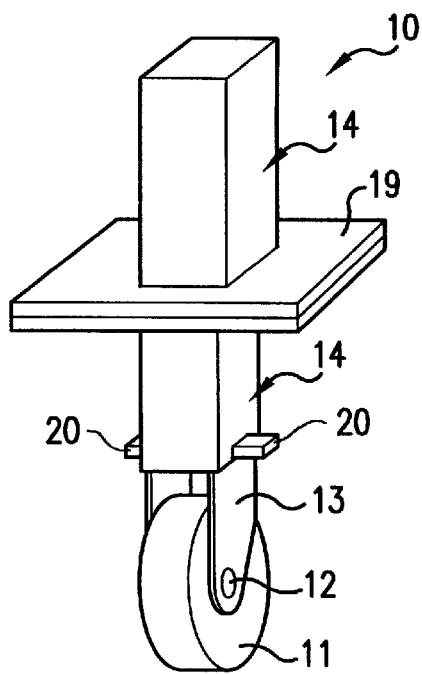
FIG. 1 is a schematic perspective view of one preferred control wheel assembly made according to the present invention.
Figure 2A:
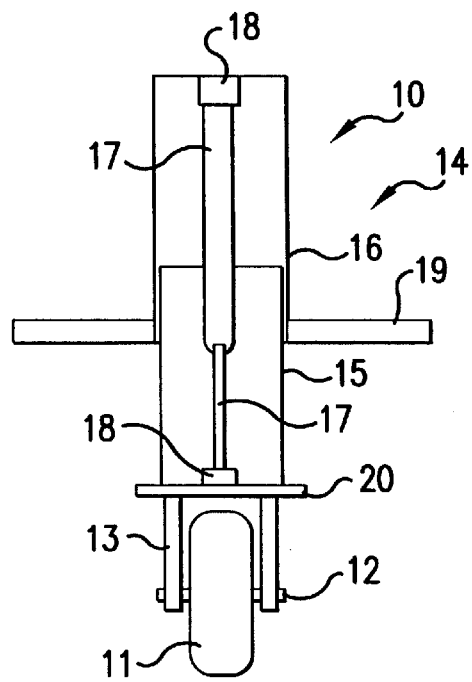
FIG. 2a is a schematic cross-sectional front view of the control wheel assembly of FIG. 1.
Figure 2B:
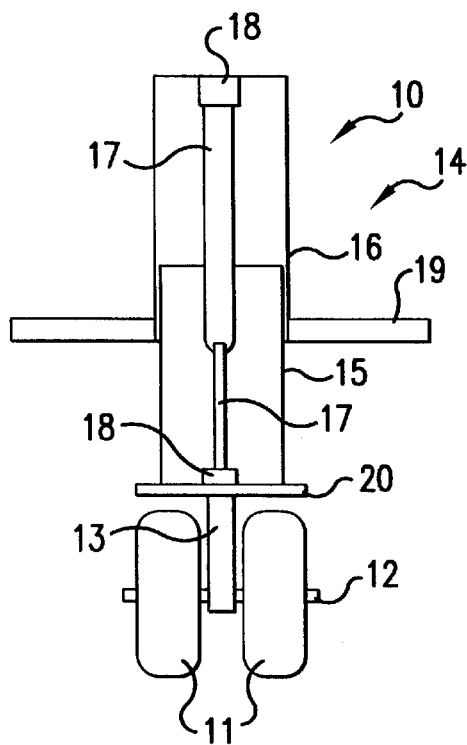
FIG. 2b is a schematic cross-sectional front view of a control wheel assembly having two wheels.

Referring to FIGS. 1 and 2 there is shown schematically a preferred control wheel assembly 10 made in accordance with the invention. The assembly 10 includes wheel means 11 (comprising a single wheel in FIG. 2a and a pair of wheels, each able to rotate independently, in FIG. 2b) free to rotate only about rotational axis 12, mounted by bracket 13 on to a telescopic member 14 comprising two square tubular sections 15 and 16 made such that section 15 is able to freely slide within section 16. Mounted within the telescopic member 14 is a gas strut 17 attached to the tube sections 15 and 16 by attachment flanges 18. The gas strut 17 provides damped bias to the telescopic movement between the tube sections 15 and 16 and thus to the wheel 11. Mounting flange 19 is provided to permit attachment of the assembly to a trolley (not shown).

The assembly may also include a lifting lug 20, where the assembly is to be attached to a nestable trolley such as a shopping trolley to permit (as will be described later) the control wheel to be lifted to permit a single trolley or a group of nested trolleys to be easily manoeuvred in a direction lateral to the normally desired direction of travel. In the case of a trolley not designed to nest there may be provided a lever mechanism (not shown in detail) which can engage lifting lug 20 to raise the wheel 11 from contact with the floor or travel contact surface. The assembly may be readily fixed to a trolley to provide excellent control of the trolley in the longitudinal direction of the trolley, that is in the direction of travel of the control wheel, whilst still permitting the trolley to be manoeuvred sideways as required depending on the nature of the floor surface on which the trolley is situated.

Figure 3:
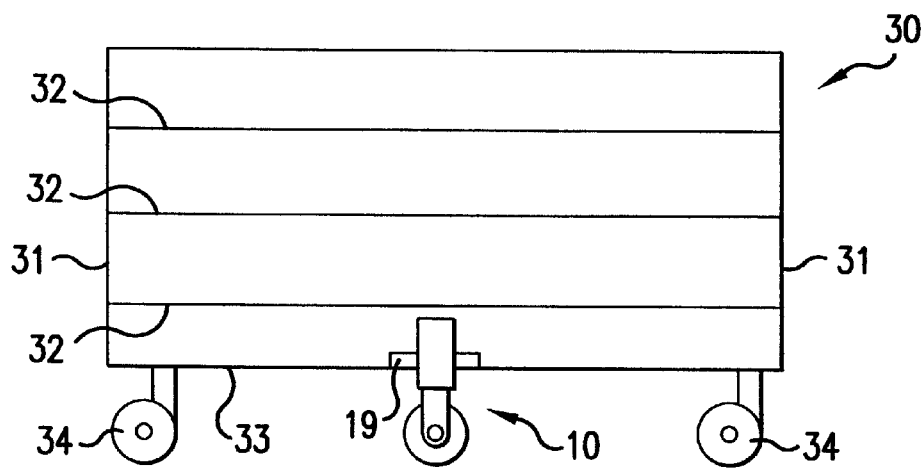
FIG. 3 is schematic side view of a trolley including a control wheel assembly according to FIG. 1.
Figure 4:
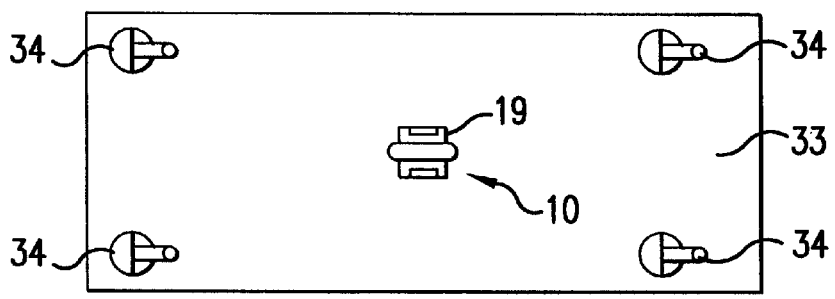
FIG. 4 is a schematic plan view of the trolley of FIG. 3.

Referring to FIGS. 3 and 4 there is shown a trolley 30 including a control wheel assembly 10 as described in detail above in relation to FIGS. 1 and 2. The trolley includes a frame 31 provided with shelves 32 and has a base 33 fitted with an array of four castors 34 fixed at or near the corners of the base 33 as is well known in the art. The control wheel assembly 10 is mounted at the centre of the array, equidistant from each of the castors 34. The control wheel assembly 10 is attached to the base 33 by means of the mounting flange 19. The control wheel assembly 10 controls the direction of travel of the trolley 30 over and above any influence of any one or more of the castors 34.

Figure 5:
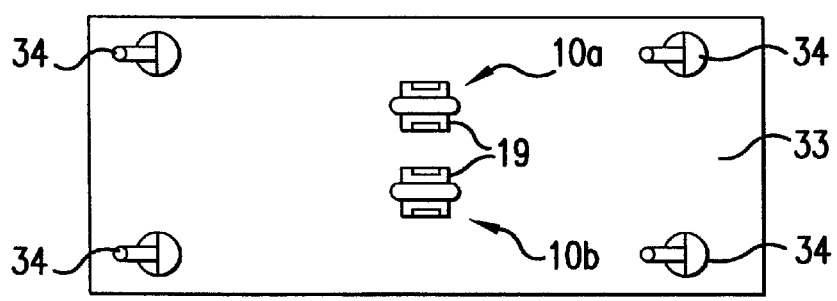
FIG. 5 is a schematic partial plan view of the trolley of FIG. 3 with two control wheel assemblies according to FIG. 1.

Referring to FIG. 5 there is shown an alternative construction of trolley 30 as shown in FIGS. 3 and 4, wherein like numbers identify like parts, in which there are two separately mounted control wheel assemblies 10a and 10b attached to the base 33 of the trolley 30. The dual control wheel assembly controls the direction of travel of the trolley 30 over and above the influence of any one or more of the castors 34. Two control wheel assemblies such as have been described may be necessary if the trolley is carry heavy loads on slippery, polished or wet and/or inclined surfaces.

Figure 6:
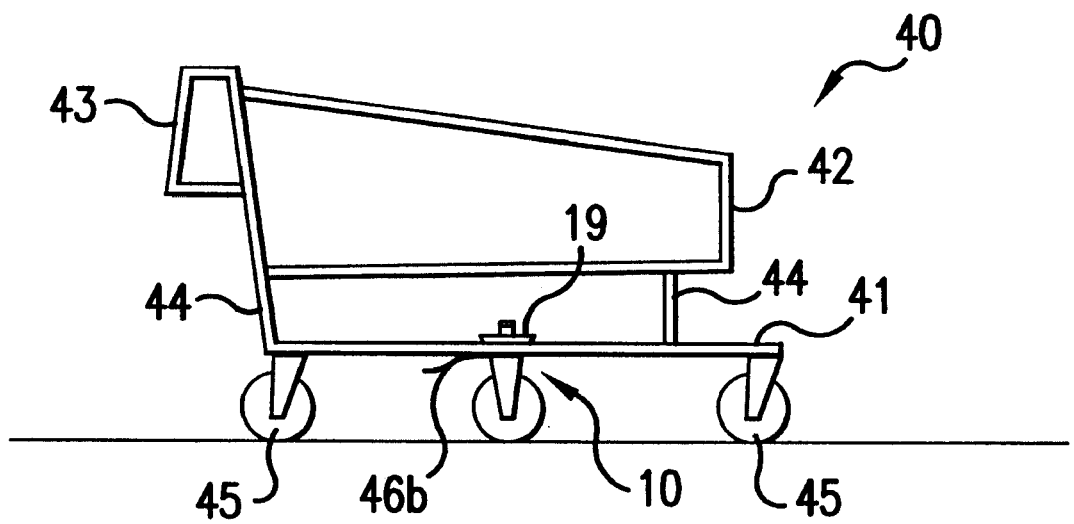
FIG. 6 is schematic side view of a shopping (i.e. "supermarket") trolley including a control wheel assembly according to FIG. 1.
Figure 7:
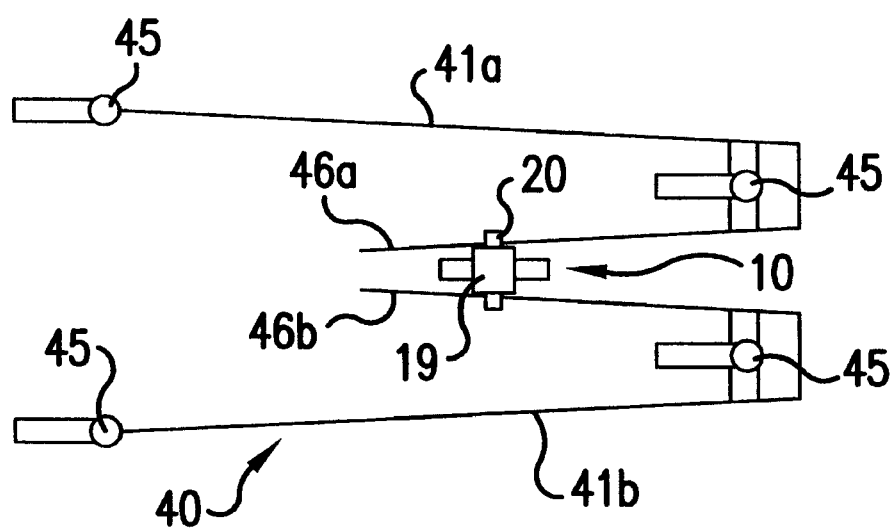
FIG. 7 is schematic partial plan view of the shopping trolley of FIG. 6.

Referring to FIGS. 6 and 7 there is shown a supermarket trolley 40 having a base frame 41 and a basket 42 with a handle 43 affixed thereto. The base frame includes posts 44 to connect the base frame 41 to the basket 42. The base frame 41 is in plan view, best seen in FIG. 7, of a "double J" form with one side frame section 41a of the base frame 41 a mirror image of the other side frame section 41b of the frame. The frame 41 is fitted with an array four castors 45 affixed at or near each corner of the base frame as is well known in the art. The side frame sections frames 41a and 41b have a control wheel assembly 10 (as described in detail above with reference to FIGS. 1 and 2) affixed thereto by means of the mounting plate 19 near their ends 46a and 46b. The ends 46a and 46b of the side frame sections 41a and 41b on a trolley are turned down for reasons which will become apparent in the following. The control wheel assembly, as previously being biased downwards, controls the direction of travel of the trolley 30 over and above the influence of any one or more of the castors 34.

Figure 8:
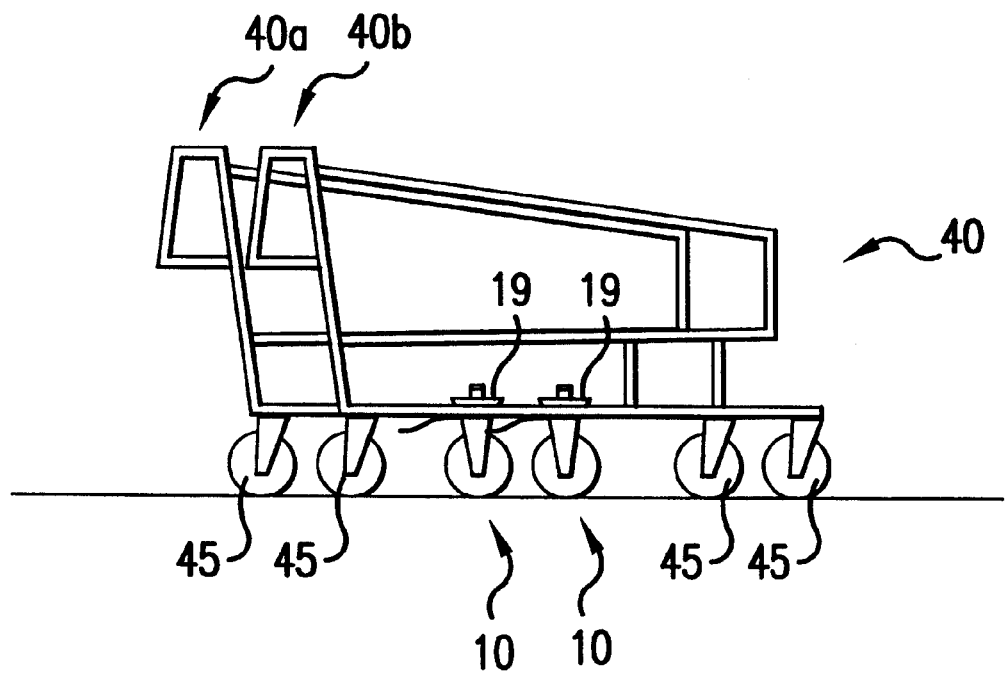
FIG. 8 is schematic side view of a number of shopping trolleys as in FIG. 6 in a stored or "nested" configuration.
Figure 9:
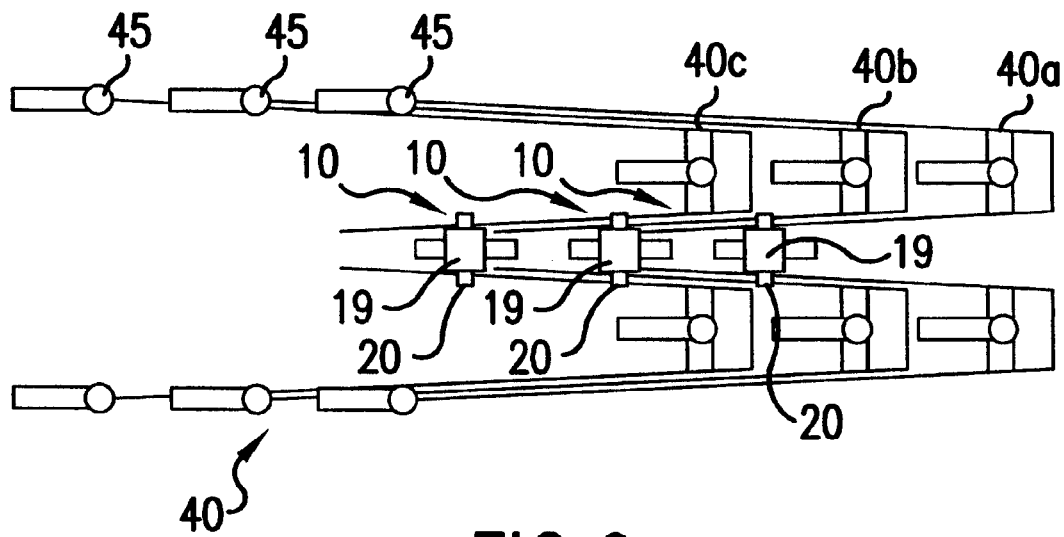
FIG. 9 is schematic partial plan view of the nested shopping trolleys of FIG. 8.

Referring to FIGS. 8 and 9 there is shown a number of shopping trolleys 40 (40a, 40b, 40c,. . . ) which are as described in relation to FIGS. 6 and 7, and in which like numbers identify like parts. A group of trolleys 50 are nested together (as is the usual requirement for such trolleys) for compact storage and transport. Each of the trolleys includes, as described above in relation to FIGS. 6 and 7, a control wheel assembly 10. The ends 46a and 46b of the side frame sections 41a and 41b on the trolleys are turned to slope downwards to form a ramp configured so that the ramp on one trolley engages the lifting lug 20 on another trolley and raises the wheel of the control wheel assembly against the action of the bias means to lift the control wheel from engagement with the ground or travel surface. This allows the group of shopping trolleys to be moved as a whole without the hindrance of the control wheel assemblies of all of the trolleys in the group.

The trolley of FIGS. 3 and 4 may preferably include a lever mechanism (not shown) to optionally engage a lifting flange to lift the wheel of the control wheel assembly from contact with the floor, ground (or other surface on which the trolley is to be used) so that the trolley can be readily moved sideways to enable the trolley to be parked in a confined space, for example.

Whilst we have described preferred embodiments of the invention herein it will be realised by those skilled in the art that many variations may be made to the invention as particularly described without departing from the scope of the invention broadly disclosed. For example it will be appreciated that the control wheel assembly of the invention does not have to be positioned exactly at the centre of the array of castors. The control wheel assembly should, for ease and evenness of control, be laterally in the middle of the trolley. The position of the control wheel assembly longitudinally on the trolley is of lesser importance and may be determined by the load centre of the trolley or by the centre of the array of castors. Preferably the two points coincide although for purpose built assymetrical trolleys, this may not be the case. The control wheel is, as previously disclosed, "fixed" in that the wheel cannot rotate about a vertical axis as a castor is able. The wheel is able to rotate about it's normal horizontal rotational axis and is "fixed" to do so in the direction in which it is normally desired that the trolley proceed. In most cases in a trolley having a substantially rectangular base or castor array, the wheel is fixed and able to rotate in the longitudinal direction (as against the transverse direction) of the trolley and is at the centre of the array of castors.

What is claimed is:

1. A trolley control wheel assembly adapted to be fitted to a trolley having a longitudinal axis of travel and an array of castors having respective castor wheels, said assembly comprising:

a fixed wheel adapted to be disposed in use on a trolley in a vicinity of one of a load center of the trolley and a center of the array of castors, and a strut assembly independent of the castors and operable to provide controlled contact between the fixed wheel and a surface on which the trolley is intended to travel, said strut assembly including a first part connected to a member which rotatably supports the fixed wheel and a second part which is fixed in use to the trolley, said first and second parts being telescopically guided with respect to each other and being configured to prevent relative rotation of said first and second parts to thereby maintain the fixed wheel in a fixed direction with respect to the trolley when in an in use position on a trolley.

2. A trolley control wheel assembly as claimed in claim 1, wherein said first part and said second part are polygonal sections.

* * * * *